United States Patent [19]

Kitamura et al.

[11] Patent Number: 5,791,521
[45] Date of Patent: Aug. 11, 1998

[54] LIQUID DISPENSING BAG AND QUANTITATIVE CHAMBER FORMING JIG FOR LIQUID DISPENSING DEVICE

[75] Inventors: Masuo Kitamura; Tetsuo Fukuoka; Kenji Ozawa, all of Tokyo; Kunio Yamada; Hajime Yamada, both of Ichikawa, all of Japan

[73] Assignee: Tokan Kogyo Co., Ltd., Tokyo, Japan

[21] Appl. No.: 661,553

[22] Filed: Jun. 11, 1996

[51] Int. Cl.[6] .................................................. B65D 35/02
[52] U.S. Cl. .......................... 222/107; 222/95; 222/105; 222/207; 222/214; 222/541.4
[58] Field of Search ........................... 222/95-97, 103, 222/105, 107, 207, 214, 541.3, 541.4

[56] References Cited

U.S. PATENT DOCUMENTS

| | | | |
|---|---|---|---|
| 2,857,079 | 10/1958 | Hall | 222/103 |
| 2,862,496 | 12/1958 | Hassler et al. | 222/103 |
| 4,463,876 | 8/1984 | Swallert | 222/94 |
| 4,717,046 | 1/1988 | Brogli | 222/107 |
| 4,759,472 | 7/1988 | Strenger | 222/541.4 |
| 5,067,635 | 11/1991 | Thomsen | 222/103 |
| 5,195,658 | 3/1993 | Hoshino | 222/541.3 |
| 5,333,758 | 8/1994 | Jamison et al. | 222/214 |
| 5,425,475 | 6/1995 | Clark | 222/103 |
| 5,501,369 | 3/1996 | Tal | 222/103 |
| 5,531,358 | 7/1996 | Corella | 222/107 |

FOREIGN PATENT DOCUMENTS 199557  9/1958  Austria ................... 222/97

Primary Examiner—J. Casimer Jacyna
Attorney, Agent, or Firm—Nikaido, Marmelstein, Murray & Oram LLP

[57] ABSTRACT

A liquid dispensing bag includes a bag body portion having a surface wall and a back wall formed of a flexible material having high gas barrier properties, and an elongated spout portion in which the surface wall and said back wall are projected in an elongated manner from a lower portion of the bag body portion. A flowpassage division area has the surface wall and the back wall welded integrally to divide a flowpassage toward the lower portion of the bag body portion. The flow passage division area is formed at a position close to the lower portion from the center of the bag body portion. The flowpassage division area is provided upwardly thereof with a pressure regulating area in which the surface wall and the back wall are welded. The flow-passage division area is formed in the central portion with a central flowpassage. Contact preventive portions for preventing contact between the surface wall and the back wall are formed in the vicinity of the central flowpassage or in the vicinity of the elongated spout portion.

7 Claims, 7 Drawing Sheets

LIQUID DISPENSING BAG AND QUANTITATIVE CHAMBER FORMING JIG FOR LIQUID DISPENSING DEVICE

BACKGROUND OF THE INVENTION

1. Field of the Invention

The present invention relates to a liquid dispensing bag and a quantitative chamber forming jig for a liquid dispensing device, which can dispense a fixed quantity of liquids filled in a bag while maintaining a fixed quality for a long period of time without entry of air and bacteria into the bag when dispensing takes place.

2. Description of the Prior Art

In the past, raw liquid supply means for a cup type vending machine or a liquid dispenser which dispenses a beverage into a cup, in case of a low acidic beverage or a neutral beverage which tends to be oxidized and to be contaminated by bacteria such as coffee, tea, oolong tea, and the like, there is a container called a bag-in-box in which bags having high gas barrier properties are encased in a cardboard box, said beverages being filled in an aseptic condition into the container in a factory. With this arrangement, even beverages that are easily oxidized and deteriorated can be preserved for long periods in a state of normal temperature, reducing a distribution cost.

However, in the liquid dispensing device such as a cup type vending machine or a liquid dispenser, at least when liquid is dispensed, air directly enters a tank. Therefore, the neutral beverages which are perishable or easily oxidized and deteriorated can be merely preserved for a short period of time. Accordingly, there is a problem in that even the beverages are filled in an aseptic condition in the factory, after the beverage have been transferred to the liquid dispensing device, oxidization and deterioration progress to fail to maintain a fixed quality. Particularly, coffee, tea, oolong tea or the like that are easily oxidized immediately after contact with air cannot maintain a high quality always in the conventional liquid dispensing device. It is not suitable for the liquid dispensing device to provide the beverage little by little in quantity. Further, in the conventional liquid dispensing device, since a liquid is supplied to a cup through a fixed nozzle, the nozzle tends to be contaminated to pose a problem in terms of hygiene.

As means for solving the above-described problem, the present inventor has previously proposed a bag with a quantitative dispensing portion which can be attached to a liquid quantitative supply device to directly dispense a fixed quantity of liquid from a bag (Japanese Patent Application Laid-Open No. 6-293348). The bag with a quantitative dispensing portion has a liquid storing bag portion for storing liquids therein and a quantitative dispensing bag portion for measuring and storing a dose to be dispensed, in which the liquid can be dispensed in a fixed quantity without contacting a part of the dispensing device, which can positively prevent air from entry into the liquid storing bag during dispensing, and which can dispense a small quantity of neutral beverages for a long period of time. However, since a pouring portion formed between the liquid storing bag portion and the quantitative dispensing bag portion is narrow in width, a torsion or a bend tends to occur, and it is cumbersome to be attached to the liquid dispensing device. Further, sometimes, a surface wall and a back wall of the pouring portion come into close contact so that the pouring portion cannot be easily opened. Further, in the state where the pouring portion is attached to the liquid dispensing device, pressure of liquid differs according to the quantity of content liquid so that an unevenness occurs in quantitative outflow time to the quantitative bag portion. Moreover, the liquid differs in a flow-down state according to the viscosity thereof but in the above-described proposal, a width of flowpassage of the pouring portion is constant. Therefore, the width of the flowpassage cannot be adjusted in order to maintain the optimum flow-down state according to the kind of content liquids.

SUMMARY OF THE INVENTION

An object of the present invention is to further improve the bag with a quantitative dispensing portion previously proposed and to provide a liquid dispensing bag for a liquid dispensing device in which even an inner solution which is severe in oxidization and deterioration such as a neutral beverage can be supplied while maintaining a fixed quality for a long period of time, which can positively dispense in a fixed quantity despite a change in a quantity of content liquid within a liquid storing bag, which is free from a torsion or contact of a pouring portion and which can dispense a fixed quantity of liquid satisfactorily.

Another object of the present invention is to provide a quantitative chamber forming jig in a liquid quantitative dispensing device which can suitably adjust a flowpassage width of a pouring portion of the liquid dispensing bag and always maintains an optimum flow-down state according to the kind of content liquids.

A liquid dispensing bag according to the present invention for achieving the aforementioned objects comprises a bag body portion comprising a surface wall and a back wall formed of a flexible material having high gas barrier properties, and an elongated spout portion in which said surface wall and said back wall are projected in an elongated manner from a lower portion of said bag body portion, characterized in that a flowpassage division area having said surface wall and said back wall welded integrally to divide a flowpassage toward the lower portion of said bag body portion is formed at a position close to the lower portion from the center of said bag body portion.

Preferably, a pressure regulating area having said surface wall and said back wall welded is formed upwardly of said flowpassage division area, and a regulating hole is formed in the pressure regulating area whereby a liquid can be always dispensed to a quantitative bag portion under substantially constant pressure. Further, a contact preventive portion for preventing the contact between the surface wall and the back wall is formed in the vicinity of a central flowpassage formed in the center of said flowpassage division area or in the vicinity of the spout to thereby positively open the central flowpassage.

The flowpassage division area can be formed from either a weld portion having at least a pair of longitudinal lines and a locating hole forming weld portion or only at least a pair of locating hole forming weld portions formed with a locating hole in the central portion thereof. Preferably, the flowpassage division area is formed with the locating hole whereby the accurate mounting to the liquid dispensing device is accomplished. A narrow false weld portion is formed upwardly of the flowpassage division area whereby a content liquid filled in the storing bag portion cannot be poured into the flowpassage forming area and the quantitative bag portion till being mounted to the liquid supply device.

Preferably, a lower side edge of the bag body portion connected to the dispensing portion is formed so that a circular rising edge which slightly rises circularly and upwardly is formed at a terminal portion of a downwardly inclined inclining edge so as to be connected to an inlet portion of the spout via the circular rising edge thereby dispensing the inner solution in a better manner.

Further, the quantitative chamber forming jig for a liquid dispensing device according to the present invention is a quantitative chamber forming jig for a liquid dispensing device having a liquid dispensing bag attached thereto to dispense a fixed quantity of an inner solution from the liquid dispensing bag, in which an upper side edge thereof is formed with a downwardly inclined inclining edge and a terminal portion of said inclining edge is formed with a circular rising edge which slightly rises circularly and upwardly, a vertical edge for forming a spout via said circular rising edge being formed.

DESCRIPTION OF THE PREFERRED EMBODIMENTS

EMBODIMENT 1

Figure 1:
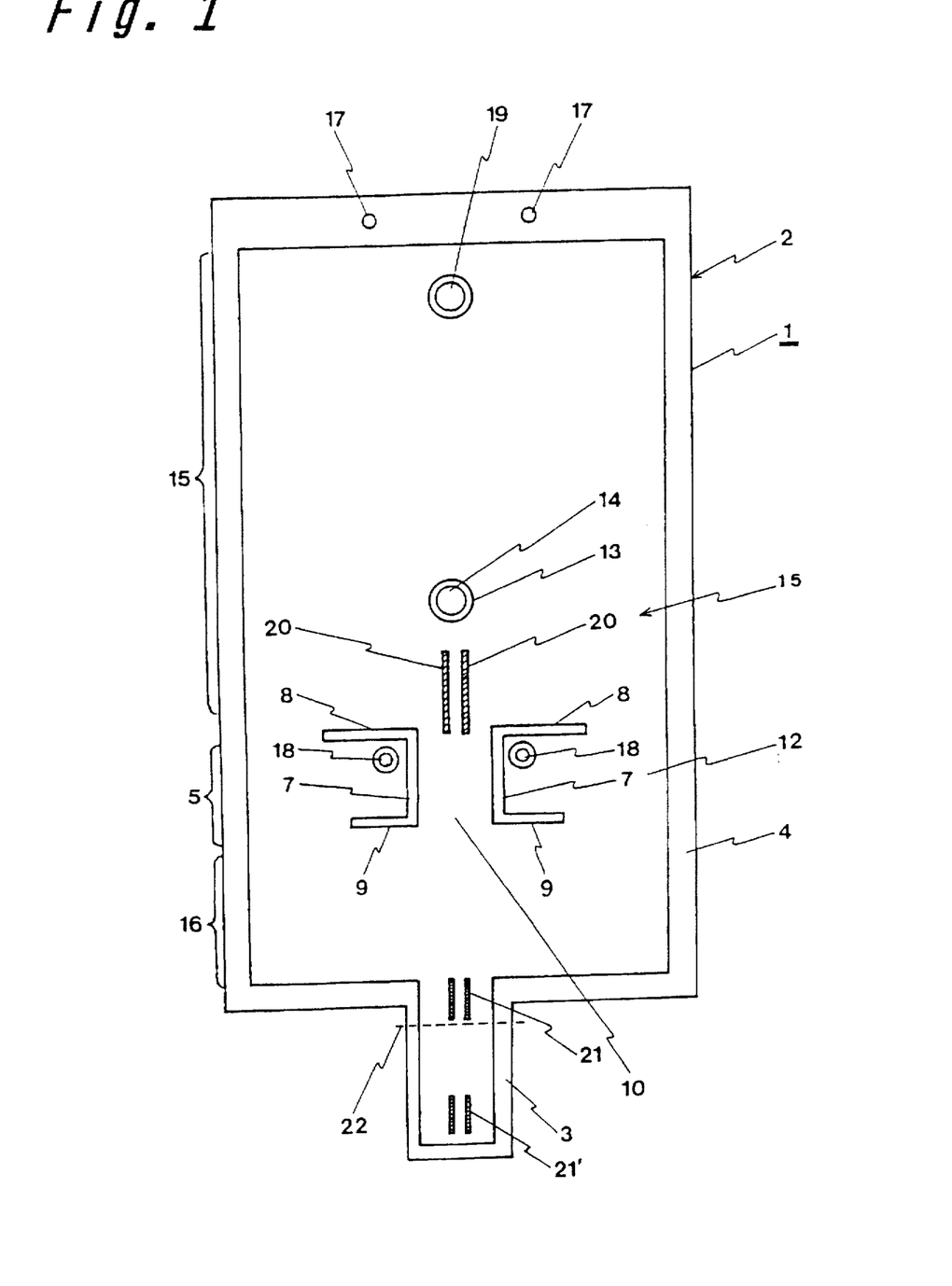
FIG. 1 is a front view of a liquid dispensing bag according to a first embodiment of the present invention.

FIG. 1 is a plan view of a first embodiment of a liquid dispensing bag according to the present invention. A liquid dispensing bag 1 according to the present invention comprises a bag body portion 2 for storing liquid therein, which is formed in a closed manner by heat-sealing a peripheral edge portion 4 of a surface wall and a back wall formed from a multi-layer film of material which is high in gas barrier properties and has a flexibility, for example, polyethylene/adhesive layer/eval/adhesive layer/polyethylene, and an elongated dispensing portion 3 in which the surface wall and the back wall are projected in an elongated manner from a lower portion of the bag body portion.

At a position close to the lower portion from the central portion of the bag body portion 2 is formed a flowpassage division area 5 for dividing a flowpassage downwardly of the bag body portion into three flowpassages. The flowpassage division area 5 is provided with longitudinal lines 7, 7 formed by integrally welding the surface wall and the back wall in parallel about a longitudinal center line at fixed intervals. Further, upper lateral lines 8, 8 extending each other in a direction of a bag side edge from the upper ends of the longitudinal lines 7, 7 and lower lateral lines 9, 9 extending in a direction of a bag side edge from the lower end are formed by integrally welding the surface wall and the back wall. With this, a central flowpassage 10 formed between the longitudinal lines 7, 7 is formed at a position close to a lower portion from the central portion of the bag body portion and side flowpassages 11, 12 formed between the extreme ends of the upper lateral lines on both sides and the bag side edges are formed to form the flowpassage division area comprising three flowpassages in total.

As described above, the flowpassage division area is provided at the lower portion in the central portion of the bag body portion whereby in the state where the bag is mounted on the liquid dispensing device as described later, a quantitative chamber forming jig touches the flowpassage division area so as to form a storing bag portion 15 and a quantitative bag portion 16 upwardly and downwardly, respectively, of the flowpassage division area 5.

In the liquid dispensing bag in the present embodiment, a pressure regulating area 13 in which the surface wall and the back wall are adhered circularly is formed at an upper position of the central flowpassage 10, and a regulating hole 14 extending through the surface wall and the back wall is formed in the central portion of the pressure regulating area 13 to regulate pressure of liquid flowing into the central flowpassage. The upper peripheral edge portion 2 is formed with two stop holes 17, 17 to stop and support the upper portion of the bag body, and a locating hole 18 extending through a position where the surface wall and the back wall are welded is formed downwardly of the upper lateral lines 8, 8 of the flowpassage division area 5 so that the flowpassage division area and the quantitative bag portion can be positively mounted on the liquid dispensing device.

A filling port 19 with a closed lid formed of plastic material is integrally mounted on the surface wall of the storing bag portion so that a liquid can be filled through the filling port. However, if a liquid is filled from an opening at the upper edge of the bag body portion and after filling, the opening at the upper edge is heat-sealed, the aforesaid filling port need not be necessarily provided as in an embodiment shown in FIG. 4 described later.

Further, in the present embodiment, two-line like contact preventive portions 20, 20 are formed along the central portion of the surface wall of the inlet portion of the central flowpassage 10. The contact preventive portions prevent both the surface wall and the back wall from being placed in contact by making surfaces in which the surface wall is opposed to the back wall surface-like configurations different from each other. In the present embodiment, a press mark is marked on only the surface wall to change the surface-like configuration of the surface wall. As means for changing the surface-like configuration, employment can be made of, other than the press mark, various means for making one surface or both surfaces a rough surface. The dispensing portion 3 is likewise provided with contact preventions 21, 21' with a press mark marked on the surface wall so as not to touch a portion where a dispensing valve is located in the state mounted on the liquid supply device described later.

In the liquid dispensing bag 1 formed as described above, in the unusing state, the dispensing portion 3 is closed by pinching a proximal end thereof by means of a detachable pin or the like from the outside as indicated by a broken line 22 so as to prevent the liquid from flowing into the dispensing portion. Under this state, when the bag is filled with a liquid in a factory, the liquid spreads into the storing bag portion 15, the flowpassage division area 5 and the quantitative bag portion 16 of the bag body portion and is filled in a predetermined quantity. Therefore, during the stage of distribution such as transportation, the flowpassage division area is not easily twisted or bended, and the present bag is very easily handled as compared with the conventional bag.

Figure 7:
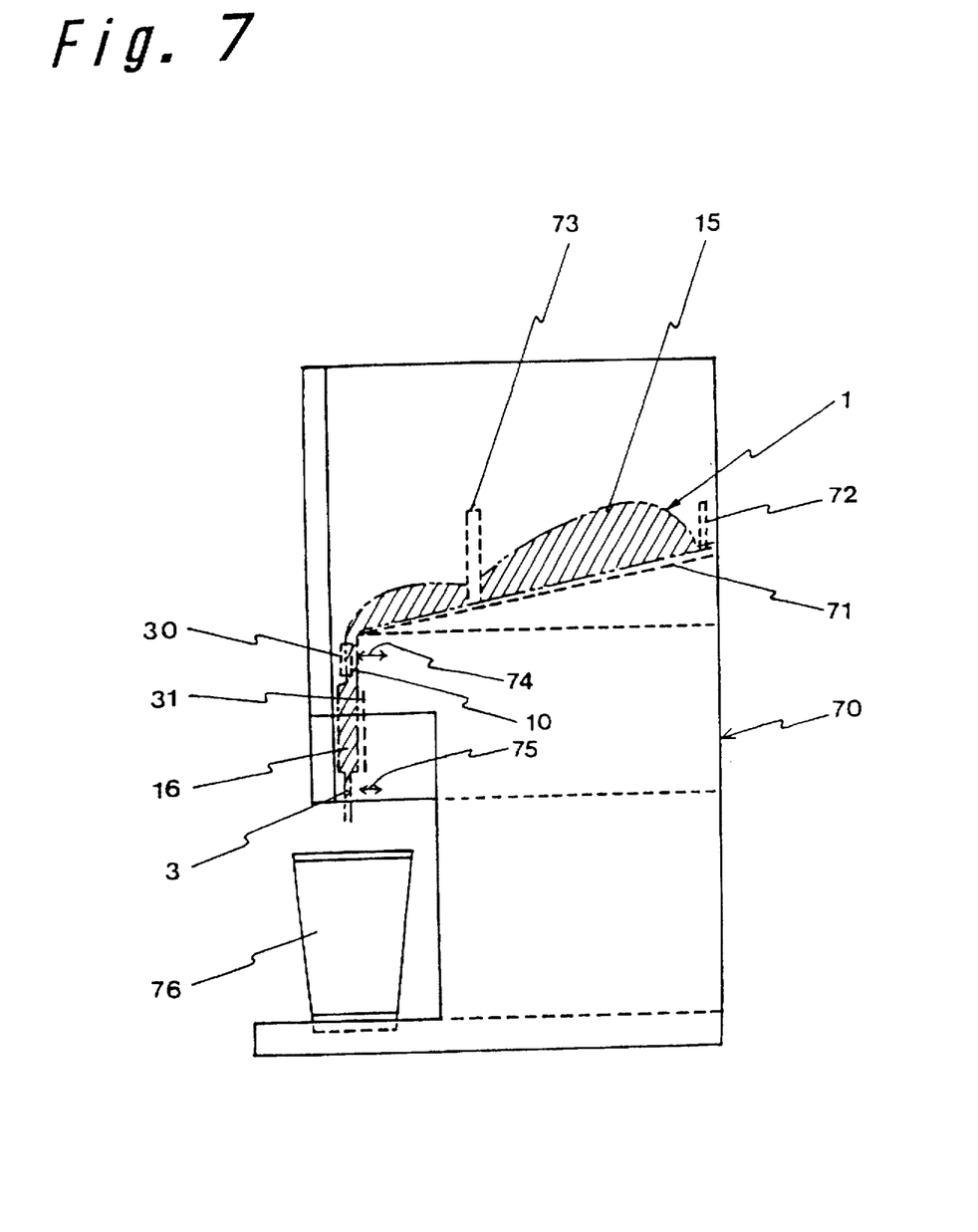
FIG. 7 is a schematic view of a liquid quantitative supply device.

The liquid dispensing bag 1 filled with the liquid can be located to a predetermined position by fitting stop holes 17, 17, an adjusting hole 14 and locating holes 18, 18 in a stop projection 72 formed on a holding bed 71 of a liquid quantitative dispensing device 70, a stop projection 73 and a stop projection (not shown) provided corresponding to the flowpassage division area, respectively, as shown in FIG. 7, and accurately mounted on the liquid quantitative dispensing device as shown in FIG. 7. As shown by a hatched imaginary line, the flowpassage division area is completely shut off leaving only the central flowpassage 10 by pressing the side flowpassage by means of quantitative chamber forming jigs 30, 30 of the liquid quantitative dispensing device, and the storing bag portion 15 is communicated with the quantitative bag portion 16 through only the central flowpassage. The spacing between the quantitative chamber forming jigs 30 and 30 is adjustable, and in the illustrated embodiment, the quantitative chamber forming jigs 30, 30 are positioned close to the side from the longitudinal lines 7, 7 but the jigs are positioned internally of the longitudinal lines whereby the width of the central flowpassage 10 can be adjusted. In the case of the inner solution of low viscosity, the central flowpassage can be made narrower than that shown.

Figure 2:
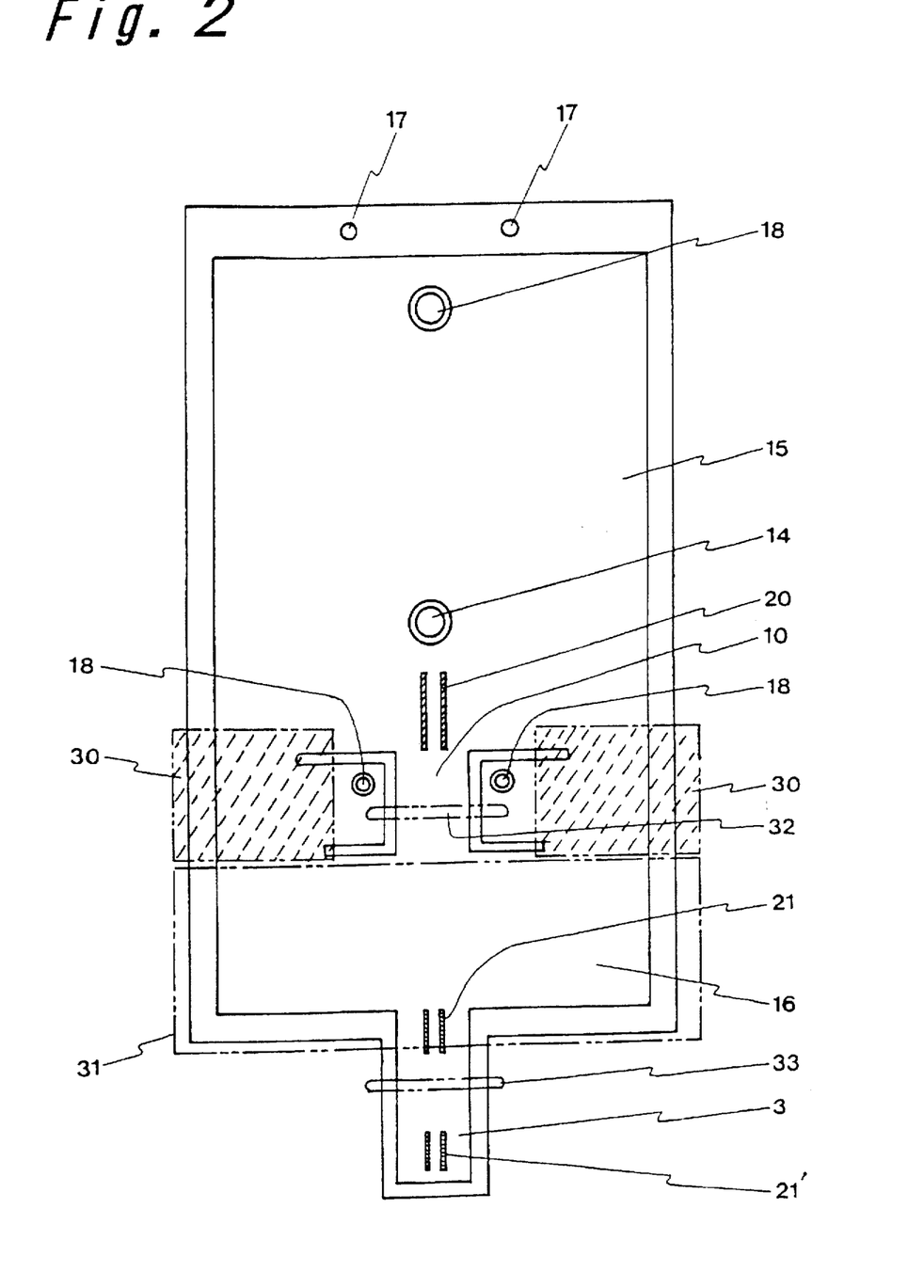
FIG. 2 is an explanatory view in a state where the liquid dispensing bag is mounted on a liquid quantitative supply device.

Under this state, a liquid extruding plate 31 (indicated by an imaginary line in FIG. 2) provided on the liquid quantitative dispensing device moves so as to form a fixed space between the liquid extruding plate and a fixed plate provided so as to pinch the quantitative bag portion opposite to the former whereby the quantitative bag portion is pressed and the surplus liquid in the quantitative bag portion is extruded into the storing bag portion so that a fixed quantity of liquid is stored in the quantitative bag portion, thus completing setting.

In the state where the liquid dispensing bag is mounted on the liquid dispensing device, a pouring valve 32 (FIG. 2) and a dispensing valve 33 are positioned at the opposite position of the central flowpassage 10 and at the opposite position of the dispensing portion 3, respectively. These pouring and valve and dispensing valve are moved by a suitable actuator at right angles to the central flowpassage 10 or the dispensing portion 3 as shown by arrows 74 and 75 in FIG. 7 to thereby open or close the central flowpassage or the dispensing portion. After the liquid dispensing bag has been set, the lower end of the dispensing portion is cut and removed to open the dispensing port, completing the preparation work for dispensing.

At the time when the liquid dispensing bag 1 is set and the preparation work is finished, as described above, a fixed quantity of liquid is stored in the quantitative bag portion 16.

Therefore, when the dispensing valve 33 releases pressing of the dispensing port by means of a suitable actuator, the dispensing port is opened so that a flow-down of liquid within the quantitative bag portion starts.

Thereafter, the liquid extruding plate 31 presses the quantitative bag portion 16 later whereby the liquid can be satisfactorily dispensed to the last without remaining the liquid in the bag. Upon the termination of dispensing, the dispensing valve 33 first advances and the pouring valve 32 then retreats, and the liquid extruding plate 31 returns to its initial position at which a predetermined clearance is formed between it and the fixed plate, whereby the liquid flows down from the storing bag portion 15 through the central flowpassage 10, and a predetermined quantity of liquid flows into the quantitative bag portion 16 to get ready for next dispensing.

In the procedure as described above, a fixed quantity of liquid can be dispensed to a cup 76 from the liquid dispensing bag 1 without contacting appliances or he like of the dispensing device at all. In the present embodiment, in dispensing as described above, since the pressure regulating area is formed upwardly of the flowpassage division area, the liquid within the storing bag portion is divided into two parts to reduce the pressure of the liquid applied to the central flowpassage, thus always enabling the flow-down of liquid to the quantitative bag portion under constant pressure even if a quantity of liquid within the storing bag portion changes. Further, since the pressure regulating area is formed with the regulating hole, which is maintained in engagement with the engaging projection of the dispensing device, the distance from the pressure regulating area to the central flowpassage can be always maintained constant. Even if the residual quantity of liquid in the storing bag portion reduces, the liquid can be satisfactorily dispensed in cooperation with the pressure regulation.

Furthermore, since the contact preventive portions are formed in the central flowpassage portion and the dispensing portion, even if the width of the central flowpassage and dispensing port is narrow, they are not in contact and smoothly opened when the valve is opened to positively dispense the liquid.

In order to confirm the operation and effect of the pressure regulation and the regulating hole in the liquid dispensing bag according to the present invention, the following experiments were conducted.

As for an embodiment of the present invention, a liquid dispensing bag for a 3-liter content was fabricated in the shape shown in FIG. 1. As a comparative example, a liquid dispensing bag having the same shape and same capacity not formed with a pressure regulating area and a regulating hole was fabricated. The respective bags are filled with 3 liters of water and are mounted on the liquid dispensing devices so that 30 g of water is dispensed every time and all the dispensing are completed with 100 times. 100 times of dispensing were repetitively carried out, and a quantity of dispensing was measured every time. In the liquid dispensing devices, a setting angle of the storing bag portion was set to 13'.

Figure 5:
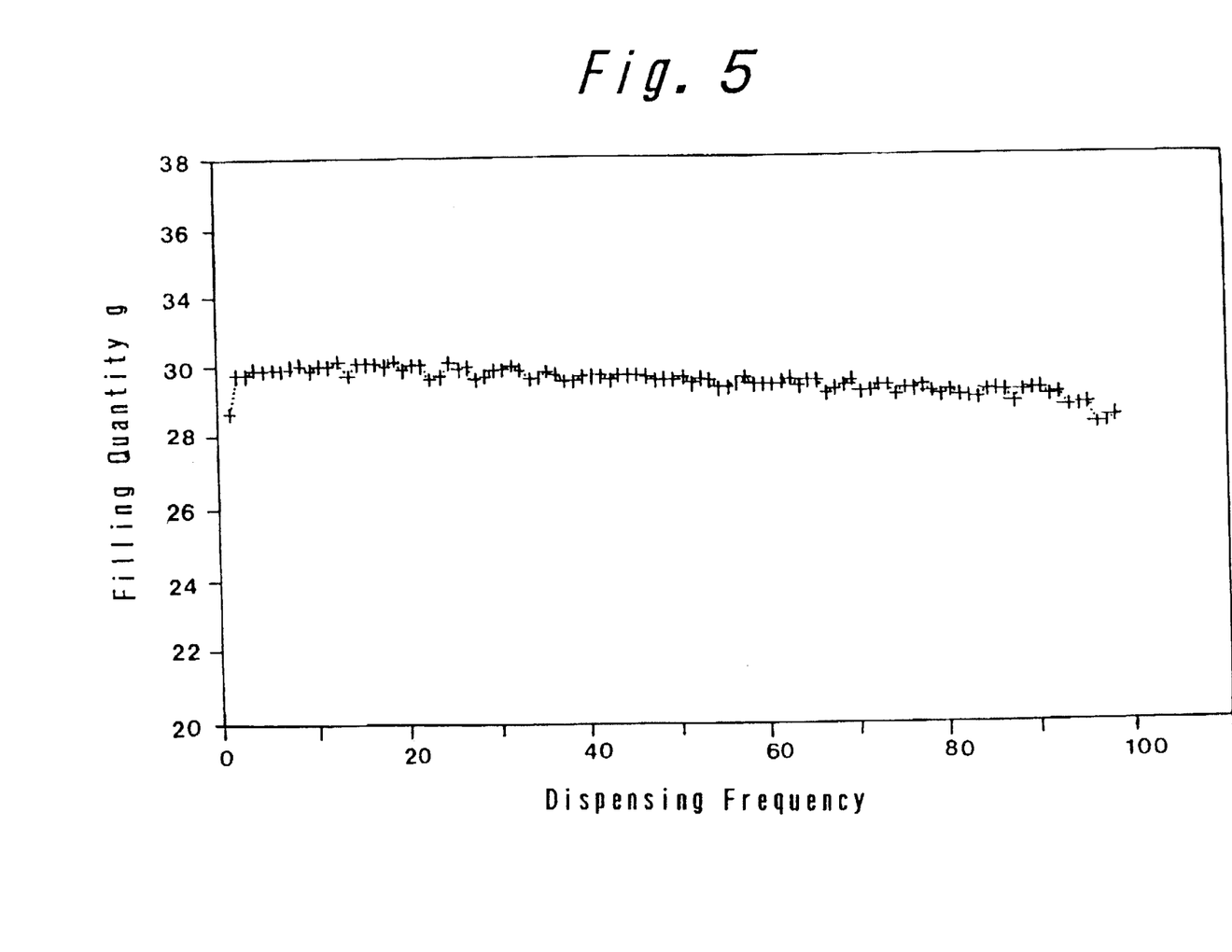
FIG. 5 is a diagram showing a relationship between dispensing frequency and a filling quantity in the liquid dispensing bag according to the first embodiment.
Figure 6:
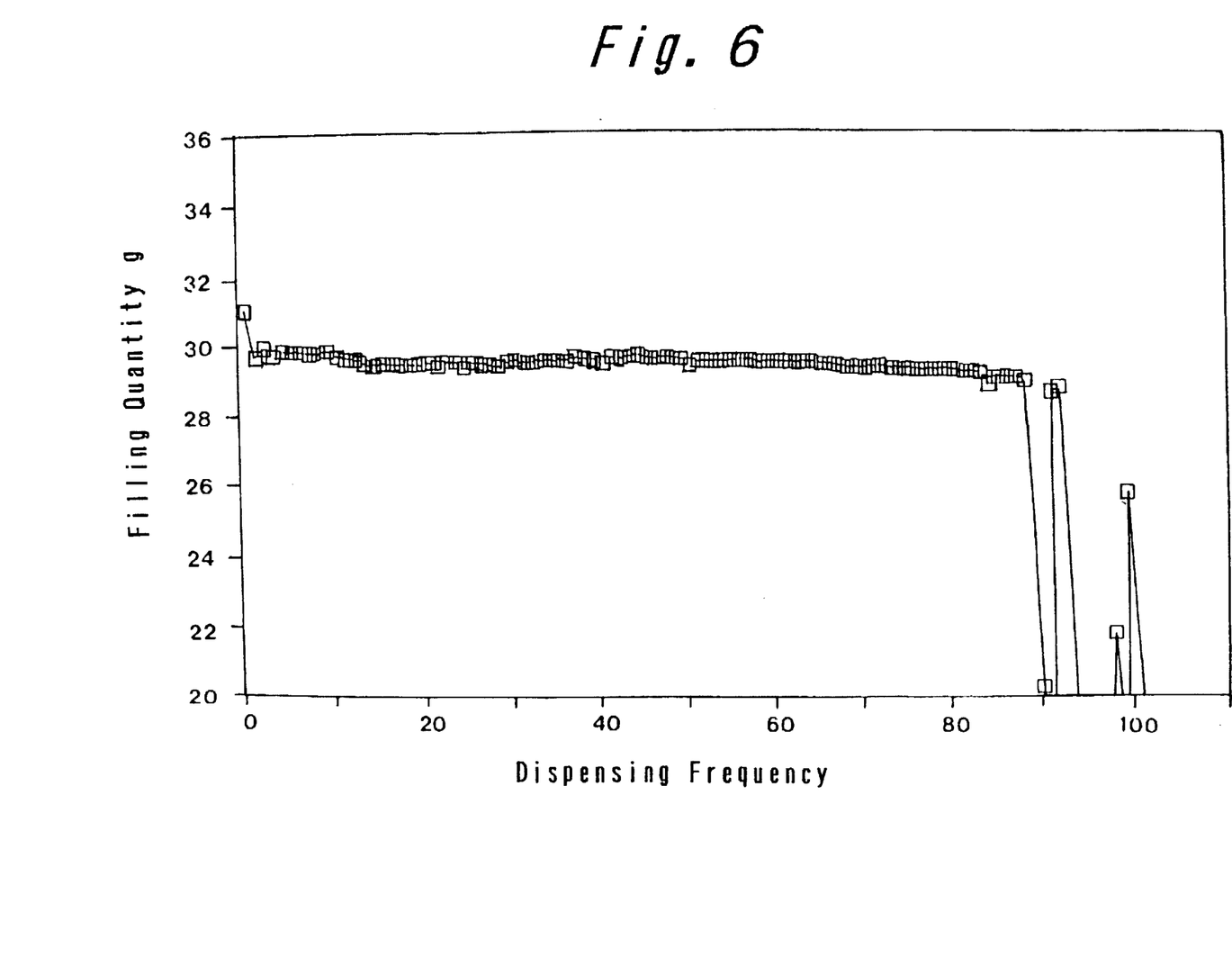
FIG. 6 is a diagram showing a relationship between dispensing frequency and a filling quantity in a liquid dispensing bag according to a comparative example.

As a result, in the case of the present embodiment, the result as shown in FIG. 5 was obtained, and in the case of the comparative example, the result as shown in graph (FIG. 6) was obtained. As will be apparent from the graph, in the case of he present embodiment, after the passage of 90 times of dispensing, there is a tendency that the dispensing quantity somewhat reduces but till the last 100 times a substantially fixed quantity of liquid can be dispensed. Dispensing was accomplished to the last without waste. In the case of the present embodiment, an average filling quantity was 29.542 g and a standard deviation was 0.39.

On the other hand, in the case of the comparative example, dispensing till 90 times was almost the same as the case of the present embodiment. However, after 90 times, an extreme unevenness occurred, failing to dispense a fixed quantity of liquid. Accordingly, in the bag in the comparative example, dispensing till 90 times or so should be terminated while remaining a large quantity of liquid within the bag, thus posing a problem that the liquid is very useless. In the case of the comparative example, an average filling quantity was 28.352 g and a standard deviation was 3.82. It is understood therefrom that unevenness is large.

It has been confirmed from the above experimental results that the provision of the pressure regulating area and the regulating hole provided marked effects in the quantitative supply of liquids, particularly, in the quantitative supply when the residual liquids in the liquid dispensing bag reduced.

Further, the construction is simple and the valve can be positively opened and closed. The operation is simple and a fixed quantity of liquid can be positively dispensed without requiring a skill. In addition, parts such as a nozzle need not be sterilized and maintenance and management are easy.

EMBODIMENT 2

Figure 3:
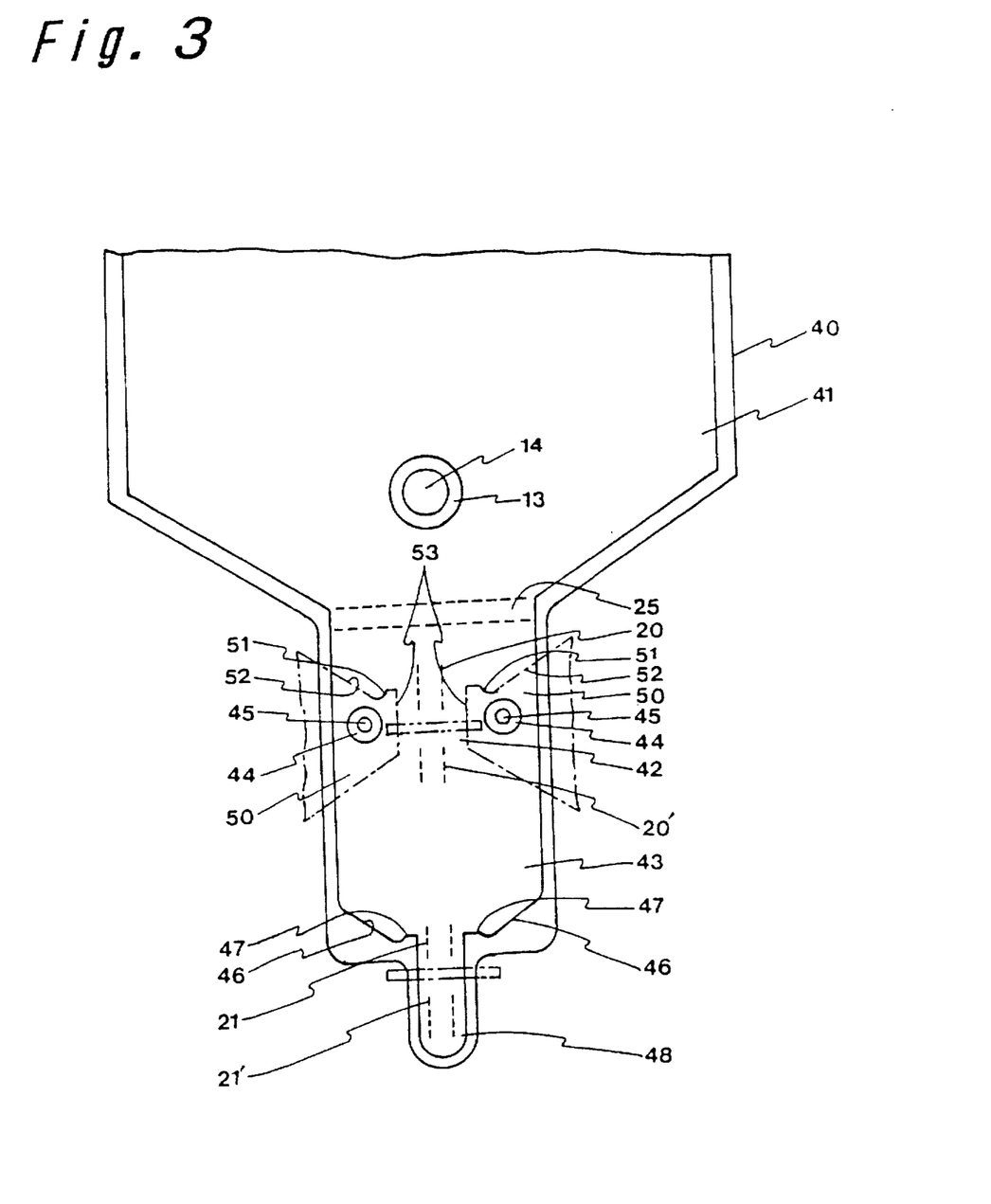
FIG. 3 is a front view of a liquid dispensing bag according to a second embodiment of the present invention.

FIG. 3 shows a second embodiment of a liquid dispensing bag according to the present invention, in which parts similar to those of the previous embodiment are indicated by the same reference numerals and the detailed description is omitted. In this embodiment, in a liquid dispensing bag 40, a lower portion of a storing bag portion 41 is tapered, at the lower end of which are formed with a flowpassge division area 42 and a quantitative bag portion 43. In the present embodiment, the flowpassage division area is formed by a pair of locating hole forming weld portions 44, 44 in which a surface wall and a back wall are merely welded, and locating holes 45, 45 are formed in the central portion thereof. Accordingly, in the present embodiment, the flowpassage is divided into three flowpassages by the pair of locating hole forming weld portions, and the central flowpassage is formed to be wider than both side flowpassages so that in the quantitative dispensing, the adjusting range of the flowpassage width by the quantitative chamber forming jigs of the dispensing device is enlarged so as to correspond to a variety of inner solutions.

Further, in the present embodiment, the storing bag portion is formed at the lower portion with a false weld portion 25 in which a surface wall and a back wall are false-welded widthwise. The false weld portion 25 is provided to prevent the inner solution filled in the storing bag portion from flowing into the flowpassage forming area and the quantitative bag portion till the former is mounted on the liquid supply device, and is false-welded so as to have a stripping strength such that it is not easily stripped in a normal distribution state but can be stripped by pressing the storing bag portion under predetermined pressure when being installed on the liquid supply device.

As the result of experiments, the stripping strength of the false weld portion which fulfills the above-described conditions is preferably in the range of 100 to 500 gf/15 mm width, more preferably in the range of 15 to 400 gf/15 mm width.

In the liquid dispensing bag according to the present embodiment, the side edge is welded so that the internal lower edge of the quantitative bag portion 43 is to be the downwardly inclined inclining edges 46, 46 as shown, the circular rising edges 47, 47 which slightly rise circularly and upwardly are formed at the terminals of the inclining edges to be connected to an inlet portion of the dispensing port via the circular rising edges 47, 47. The just mentioned shape has been found as the result of repeated experiments in connection with means for satisfactorily dispensing a liquid without an dispensing port 48 being contacted or bended. It has been confirmed that by the provision of the aforesaid shape, the liquid can be dispensed most smoothly without the dispensing port being contacted or bended irrespective of the quantity of the inner solution. Particularly, at the start of dispensing, there sometimes occurs a phenomenon that an outflow inlet bends due to the abrupt change of pressure. However, such a phenomenon as described was completely eliminated by the provision of the aforementioned shape.

For the similar reasons, in the present embodiment, an upper edge shape of a quantitative chamber forming jig 50 which plays a part of forming an dispensing portion to the quantitative chamber portion in dispensing of a fixed quantity of liquid was formed similarly to a lower edge of a quantitative bag portion of the dispensing bag. That is, the quantitative chamber forming jig 50 in the present embodiment is that the upper side has a downwardly inclined edge 52, the extreme end is a circular rising edge 51 and the extreme end thereof is a vertical edge 53 for determining a flowpassage width of the central outflow passage of the liquid dispensing bag. By formation of the quantitative chamber forming jig as described above, the liquid can be satisfactorily flown down to the quantitative chamber portion.

The quantitative chamber forming jig 50 is mounted on the liquid dispensing device (not shown) adjustably in spacing and closably. The spacing is adjusted and set according to the viscosity of liquid to be dispensed.

EMBODIMENT 3

Figure 4:
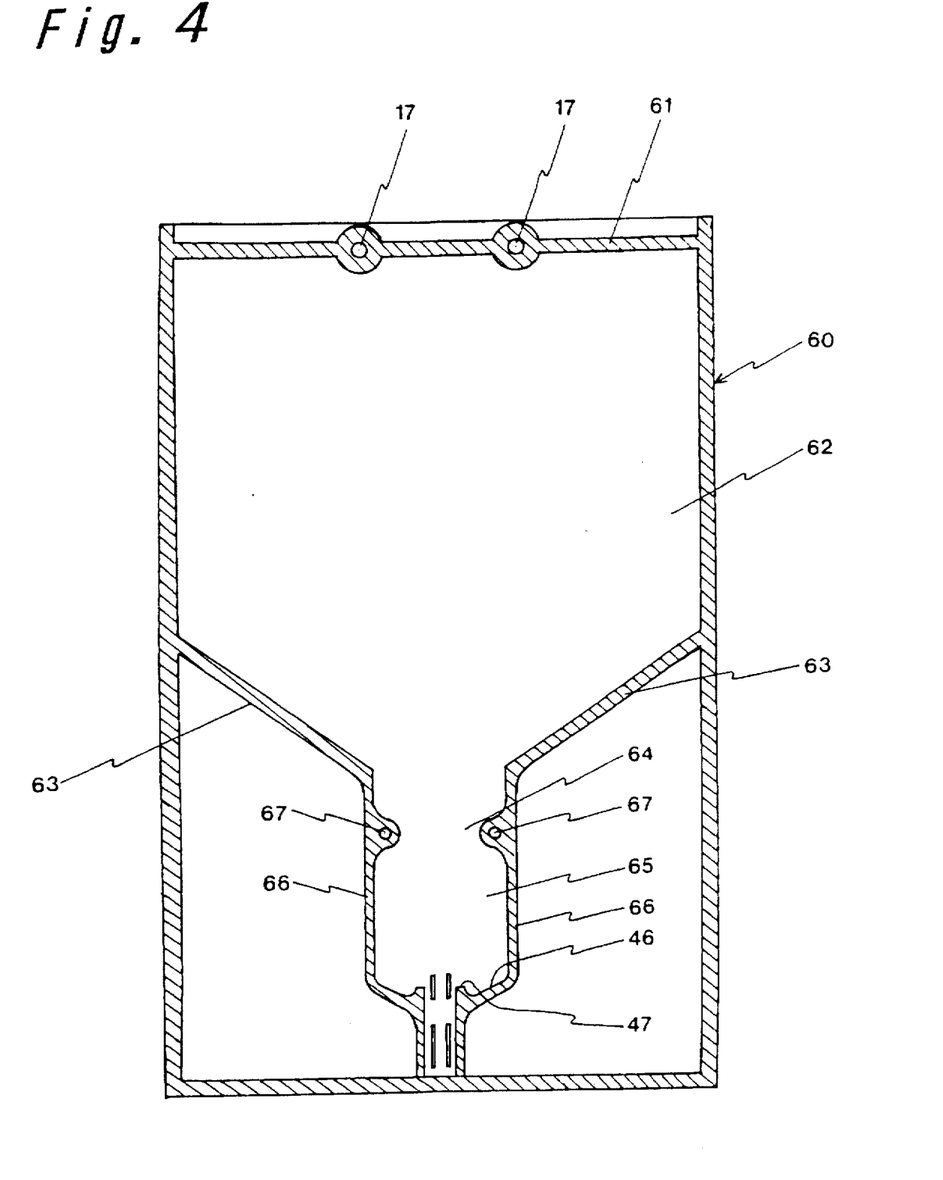
FIG. 4 is a front view of a liquid dispensing bag according to a third embodiment of the present invention.

FIG. 4 shows a third embodiment of a liquid dispensing bag according to the present invention, in which parts similar to those of the previous embodiment are indicated by the same reference numerals and the detailed description is omitted.

A liquid dispensing bag 60 in the present embodiment is basically similar to the second embodiment except that in the present embodiment, a filling port is eliminated, and after being filled with an inner solution in a filling factory, an upper edge 61 of the bag is sealed and closed. Further, the pressure regulating area 13 and the regulating hole 14 are not provided. The pressure regulating area and the regulating hole are not provided in the present embodiment since dispensing in a fixed quantity can be satisfactorily accomplished without providing them depending on the size of a bag, the kind of inner solutions and mounting state to the device.

Further, in the present embodiment, four sides of a substantially rectangular bag are welded, tapered weld portions 63, 63 forming a lower side of a storing bag portion 62 are formed internally thereof, and lower ends of the tapered weld portions are made continuous to longitudinal weld portions 66, 66 forming a flowpassage division area 64 and a quantitative bag portion 65.

Reference numerals 67, 67 designate a pair of locating holes provided in the flowpassage division area 64. In the present embodiment, since the flowpassage division area 64 is merely provided with a single flowpassage corresponding to the central flowpassage, a supply to the quantitative bag becomes enabled without using a jig. Further, since the central flowpassage is formed to be relatively wide, the liquid was satisfactorily flown down to the quantitative bag portion without the provision of the contact preventive portion. Particularly, in the present embodiment, the whole body is rectangular, and the lower portion is wide similar to the upper portion. Therefore, the lower portion is not twisted and handling is easy. Setting to the liquid dispensing device is also easy.

While in the foregoing, various embodiments of the liquid dispensing bags according to the present invention have been described, it is to be noted that the present invention is not limited to the above embodiments but various changes in design can be made. For example, while in the above-described embodiments, the bag body portion is rectangular in shape, it is to be noted that other shapes can be employed. Further, in the first and third embodiment, the false weld portion is not formed but the false weld portion may be formed similarly to the second embodiment. Conversely speaking, in the second embodiment, the false weld portion need not necessarily be provided. Further, the pressure regulating area is provided in the center close to the central flowpassage portion but a plurality of pressure regulating areas may be formed in a width spaced relation as necessary, and it need not necessarily be provided as in the third embodiment.

Furthermore, in the above-described embodiments, the quantitative bag portion is mounted on the liquid quantitative dispensing device to allow a fixed quantity of liquid to flow into the bag for dispensing in a fixed quantity of liquid. However, the liquid dispensing bag according to the present invention can be used not only for the aforementioned method of use but for other liquid dispensing devices for dispensing not in contact with liquids from the bag. For example, in the first embodiment, in the case where a dispensing valve provided in the dispensing portion is operated by a timer or manually to dispense a suitable quantity of liquid, all of three flowpassages in the flowpassage division area are opened, in which state the dispensing is carried out. In this case, the bag body portion is provided with three flow passage division areas and pressure regulating areas whereby liquid pressure applied to the dispensing portion is regulated to maintain the dispensing pressure substantially constant. Even in the state where the inner solution is full, satisfactory dispensing is carried out.

In the above-described embodiment, the quantitative chamber forming jig touches the flowpassage division area, but there is not limited thereto. Alternatively, the quantitative chamber forming jig is placed in touch a portion lower than the flowpassage division area so that the quantitative chamber in-flow passage is positioned below the central flowpassage. In that case, the contact preventive portion may be formed so as to be positioned substantially at the quantitative in-flow passage.

As described above, according to the liquid dispensing bag of the present invention, in the state where the bag is not mounted on the liquid dispensing device, the liquid is filled in the state where the liquid spreads over the storing bag portion, the flowpassage division area and the entire interior of the quantitative bag portion of the bag body portion. Therefore, the flowpassage division area is not simply twisted or bended in the distribution stage such as transportation. The liquid dispensing bag of the present invention is very easy in handling and simple in mounting to the liquid dispensing device as compared with the conventional bags. In the state where the bag is mounted on the liquid quantitative dispensing device, the flowpassage division area is completely shut off in the side flowpassage leaving only the central flowpassage, and the storing bag portion and the quantitative bag portion are in communication through only the central flowpassage. In this state, a fixed clearance relative to the fixed plate is formed by the liquid extruding plate provided on the liquid quantitative dispensing device whereby the quantity of liquids within the quantitative bag portion is controlled so that a fixed quantity of liquids can be stored to enable the quantitative dispensing.

Further, the contact preventive portion is formed in the vicinity of the central portion or inlet portion of the central flowpassage whereby even if the width of the pouring portion and the dispensing port is narrow, they are not in contact and are smoothly opened when the valve is opened to positively dispense the liquid. Further, in the case where the quantitative bag portion of the liquid dispensing bag according to the present invention is not used for measuring, all the flowpassages of the flowpassage division area are opened for use. In this case, pressure is regulated even in the flowpassage division area in cooperation with the pressure regulating area so that dispensing pressure from the dispensing port can be maintained substantially constant, and satisfactory dispensing can be accomplished.

In addition, in the quantitative dispensing, the flowpassage width of the pouring port to the quantitative bag portion is not specified but the flowpassage width can be adjusted in the state where the bag is mounted on the liquid dispensing device. Therefore, the flowpassage width of the pouring port can be suitably adjusted according to the viscosity of liquid or the like so that the liquid can be always flown into the quantitative bag portion in the optimum condition. As the result, the quantitative properties can be more positively secured.

In the quantitative chamber forming jig of the liquid dispensing device, an upper side edge thereof is formed with a downwardly inclined inclining edge and a terminal portion of said inclining edge is formed with a circular rising edge which slightly rises circularly and upwardly, a vertical edge for forming a spout via said circular rising edge being formed. Therefore, for the reasons similar to the lower side edge shape of the bag body, the pouring port is not bended when the liquid flows down into the quantitative bag portion, and satisfactory dispensing can be always accomplished.

What is claimed is:

1. A liquid dispensing bag for a liquid dispensing device, comprising:

a bag body portion including a surface wall and a back wall formed of a flexible material having high gas barrier properties, and an elongated spout portion in which said surface wall and said back wall are projected in an elongated manner from a lower portion of said bag body portion; and a flowpassage division area having said surface wall and said back wall welded integrally to divide a flowpassage toward the lower portion of said bag body portion said flowpassage division area formed at a position close to the lower portion from a center of said bag body portion, said flowpassage division area dividing said bag body portion into a storing bag portion and a quantitative bag portion, wherein said flowpassage division area is formed by at least a pair of locating hole forming weld portions, each formed with a locating hole in a central portion thereof, said flowpassage division area divided into three flowpassage areas by said at least a pair of locating hole forming weld portions.

2. The liquid dispensing bag according to claim 1, wherein said flowpassage division area is provided upwardly thereof with a pressure regulating area in which said surface wall and said back wall are adhered.

3. The liquid dispensing bag according to claim 2, wherein said pressure regulating area is formed with a regulating hole.

4. The liquid dispensing bag according to claim 1, wherein said flowpassage division area is formed in a central portion with a central flowpassage, and contact preventive portions for preventing contact between the surface wall and the back wall are formed in one of a vicinity of said central flowpassage and a vicinity of said elongated spout portion.

5. The liquid dispensing bag according to claim 1, wherein a narrow false weld portion is formed above said flowpassage division area.

6. The liquid dispensing bag according to claim 1, 2 or 4, wherein a lower side edge of said bag body portion comprises a downwardly inclined inclining edge, and a circular rising edge formed so as to slightly rise circularly and upwardly in a terminal portion of said inclining edge, being connected to said spout portion via said circularly rising edge.

7. A quantitative chamber forming jig for a liquid dispensing device having a liquid dispensing bag adapted to be attached thereto to dispense a fixed quantity of an inner solution from the liquid dispensing bag, said quantitative chamber forming jig having left and right portions with each portion comprising:
- an upper side edge formed with a downwardly inclined inclining edge and a terminal portion of said inclining edge is formed with a circular rising edge which slightly rises circularly and upwardly; and
- a vertical edge for forming a spout, said vertical edge connected to said upper side edge via said circular rising edge, said quantitative chamber forming jig is adapted to form a quantitative chamber in the liquid dispensing bag by pressing against the bag to separate said quantitative chamber from a liquid storing portion of the bag with the spout having a liquid inlet adjacent said circular rising edge and a liquid outlet spaced below said inlet.

* * * * *